US010061848B2

(12) United States Patent
Basu et al.

(10) Patent No.: US 10,061,848 B2
(45) Date of Patent: Aug. 28, 2018

(54) ONTOLOGY-CROWD-RELEVANCE DEEP RESPONSE GENERATION

(71) Applicant: Microsoft Technology Licensing, LLC, Redmond, WA (US)

(72) Inventors: Sumit Basu, Seattle, WA (US); Lucretia Vanderwende, Sammamish, WA (US); Igor I. Labutov, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 528 days.

(21) Appl. No.: 14/720,278

(22) Filed: May 22, 2015

(65) Prior Publication Data
US 2016/0342685 A1   Nov. 24, 2016

(51) Int. Cl.
*G06F 17/30* (2006.01)
(52) U.S. Cl.
CPC .............. *G06F 17/30734* (2013.01)
(58) Field of Classification Search
None
See application file for complete search history.

(56) References Cited

U.S. PATENT DOCUMENTS

| 8,370,278 | B2 | 2/2013 | Vadlamani et al. |
| 2009/0106234 | A1* | 4/2009 | Siedlecki ......... G06F 17/30864 |
| 2011/0125734 | A1 | 5/2011 | Duboue et al. |
| 2013/0018828 | A1 | 1/2013 | He et al. |
| 2013/0149688 | A1 | 6/2013 | Bean |
| 2014/0156260 | A1 | 6/2014 | Zweig et al. |
| 2014/0379330 | A1 | 12/2014 | Baughman et al. |
| 2016/0148093 | A1* | 5/2016 | Adderly ............. G06F 17/3089 706/46 |

OTHER PUBLICATIONS

Agarwal, et al., "Automatic Question Generation Using Discourse Cues", In Proceedings of the Sixth Workshop on Innovative Use of NLP for Building Educational Applications, Jun. 24, 2011, 9 pages.
Al-Yahya, Maha, "OntoQue: A Question Generation Engine for Educational Assesment Based on Domain Ontologies", In Proceedings of 11th IEEE International Conference on Advanced Learning Technologies, Jul. 6, 2011, pp. 393-395.
Anderson, et al., "On Asking People Questions about what they are Reading", In Proceedings of Psychology of Learning and Motivation, vol. 9, Retrieved on: May 6, 2015, 1 pages.

(Continued)

*Primary Examiner* — Anh Tai Tran
(74) *Attorney, Agent, or Firm* — Schwegman Lundberg & Woessner, P.A.

(57) ABSTRACT

Generating responses to input utilizing an ontology-crowd-relevance methodology is described. The techniques described herein access a plurality of data items and determine an ontology associated with the plurality of data items. The ontology includes one or more ontological elements. Furthermore, the techniques describe sending, to a plurality of devices, a request to generate response templates based on the one or more ontological elements and receiving, from the plurality of devices, the response templates directed to the one or more ontological elements.

11 Claims, 8 Drawing Sheets

(56) References Cited

OTHER PUBLICATIONS

Andre, Thomas, "Does Answering Higher-level Questions while Reading Facilitate Productive Learning?", In Journal of Review of Educational Research, vol. 49, Issue 2, Retrieved on: May 6, 2015, 1 page.
Becker, et al., "Mind the Gap: Learning to Choose Gaps for Question Generation", In Proceedings of the Conference of the North American Chapter of the Association for Computational Linguistics: Human Language Technologies, Jun. 3, 2012, 10 pages.
Chen, et al., "Generating Questions Automatically from Informational Text", In Proceedings of the 2nd Workshop on Question Generation, Jul. 6, 2009, 8 pages.
Curto, et al., "Exploring Linguistically-rich Patterns for Question Generation", In Proceedings of the UCNLG+Eval: Language Generation and Evaluation Workshop, Jul. 31, 2011, 6 pages.
Demartini, et al., "ZenCrowd: Leveraging Probabilistic Reasoning and Crowdsourcing Techniques for Large-Scale Entity Linking", In Proceedings of International World Wide Web Conference, Apr. 16, 2012, 10 pages.
Fan, et al., "A Hybrid Machine-Crowdsourcing System for Matching Web Tables", In Proceedings of IEEE 30th International Conference on Data Engineering, Mar. 31, 2014, 14 pages.
Fan, et al., "LIBLINEAR: A Library for Large Linear Classification", In Journal of Machine Learning Research, vol. 9, Jun. 2008, 4 pages.
Heilman, et al., "Good Question! Statistical Ranking for Question Generation", In Proceedings of Human Language Technologies: The Annual Conference of the North American Chapter of the ACL, Jun. 2010, 9 pages.
Heilman, et al., "Ranking Automatically GeneratedQuestions as a Shared Task", In Proceedings of 2nd Workshop on Question Generation, vol. 1, Jul. 6, 2009, 8 pages.
Kondreddi, et al., "Combining Information Extraction and Human Computing for Crowdsourced Knowledge Acquisition", In Proceedings of 30th IEEE International Conference on Data Engineering, Mar. 31, 2014, 12 pages.
Lindberg, et al., "Generating Natural Language Questions to Support Learning On-line", In Proceedings of the 14th European Workshop on Natural Language Generation, Aug. 8, 2013, 10 pages.
Mannemx, et al., "Question Generation from Paragraphs at UPenn: QGSTEC System Description", In Proceedings of Third Workshop on Question Generation, Jun. 18, 2010, 8 pages.
Manning, et al., "Introduction to Information Retrieval", In Publication of Cambridge University Press, Jul. 7, 2008, 18 pages.
Mazidi, et al., "Linguistic Considerations in Automatic Question Generation", In Proceedings of the 52nd Annual Meeting of the Association for Computational Linguistics, Jun. 23, 2014, pp. 321-326.
McMillan, James H., "Secondary Teachers' Classroom Assessment and Grading Practices", In Proceedings Educational Measurement: Issues and Practice, vol. 20, Issue 1, Mar. 2001, 2 pages.
Mikolov, et al., "Distributed Representations of Words and Phrases and their Compositionality", In Proceedings of Advances in Neural Information Processing Systems 26: 27th Annual Conference on Neural Information Processing Systems, Dec. 5, 2013, 9 pages.
Mitkov, et al., "Computer-Aided Generation of Multiple-Choice Tests", In Proceedings of the HLT-NAACL Workshop on Building Educational Applications using Natural Language Processing—vol. 2, May 31, 2003, pp. 17-22.
Olney, et al., "Question Generation from Concept Maps", In Proceedings of Dialogue and Discourse, vol. 3, Issue 2, Mar. 2013, pp. 75-99.
Papasalouros, et al., "Automatic Generation of Multiple Choice Questions from Domain Ontologies", In Proceedings of IADIS International Conference e-Learning, Jul. 22, 2008, 8 pages.
Ramage, et al., "Labeled LDA: A Supervised Topic Model for Credit Attribution in Multi-Labeled Corpora", In Proceedings of the Conference on Empirical Methods in Natural Language Processing: vol. 1, Aug. 6, 2009, pp. 248-256.
Rus, et al., "Overview of the First Question Generation Shared Task Evaluation Challenge", In Proceedings of the Third Workshop on Question Generation, Jun. 2010, pp. 45-57.
Sarasua, et al., "CROWDMAP: Crowdsourcing Ontology Alignment with Microtasks", In Proceedings of 11th International Conference on the Semantic Web—vol. Part I, Nov. 11, 2012, 16 pages.
Schwartz, et al., "Dynamic Language Learning Tools", In Proceedings of STIL/ICALL Symposium on Computer Assisted Learning, Jun. 2004, 4 pages.
Wohlgenannt, et al., "Crowd-based Ontology Engineering with the uComp Protege Plugin", In Semantic Web Journal, Retrieved on: May 6, 2015, 29 pages.
Wolfe, John H., "Automatic Question Generation from Text—An Aid to Independent Study", In Proceedings of the ACM SIGCSE-SIGCUE Technical Symposium on Computer Science and Education, Feb. 1, 1976, pp. 104-112.
Yao, et al., "Question Generation with Minimal Recursion Semantics", In Proceedings of the Third Workshop on Question Generation, Jun. 2010, 8 pages.

* cited by examiner

US 10,061,848 B2

ONTOLOGY-CROWD-RELEVANCE DEEP RESPONSE GENERATION

BACKGROUND

In some examples, users may be interested in generating responses corresponding to content. For instance, teachers may be interested in generating responses that are questions that correspond to a piece of content to assess their students' reading comprehension, math skills, etc. Manually generating questions is time consuming and as such, requires tremendous amounts of human labor and money. Current automatic techniques for generating questions focus on the grammaticality of question generation to generate "wh-questions" from single sentences. Other automatic techniques create fill-in-the-blank questions from single sentences to ensure grammaticality. That is, current techniques automatically generate questions directed to specific facts (e.g., factoid questions) in a single sentence of text. As a result, fully automated computer generated questions often lack scope and depth.

SUMMARY

This disclosure describes generating and providing deep responses to data inputs. Specifically, techniques described herein streamline deep response (e.g., a question, comment, annotation, etc.) generation utilizing an ontology-crowd-relevance methodology. The techniques described herein include accessing a plurality of data items and determining an ontology for the plurality of data items. The ontology may include one or more ontological elements. Based at least in part on determining the ontological elements, the techniques herein describe sending, to a plurality of devices, a request to generate response templates based on the ontological elements and receiving, from the plurality of devices, the response templates directed to the ontological elements.

Additionally, the techniques described herein include receiving a data item from a user device and extracting one or more ontological elements from the data item. Based at least in part on extracting the one or more ontological elements from the data item, the techniques described herein include accessing two or more response templates associated with the one or more ontological elements and creating two or more responses based at least in part on supplementing the two or more response templates with information that is specific to the data item. The techniques described herein further include ranking individual responses of the two or more responses based at least in part on a relevance between the individual responses and the data item and causing at least one of the ranked individual responses to be presented via the user device.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
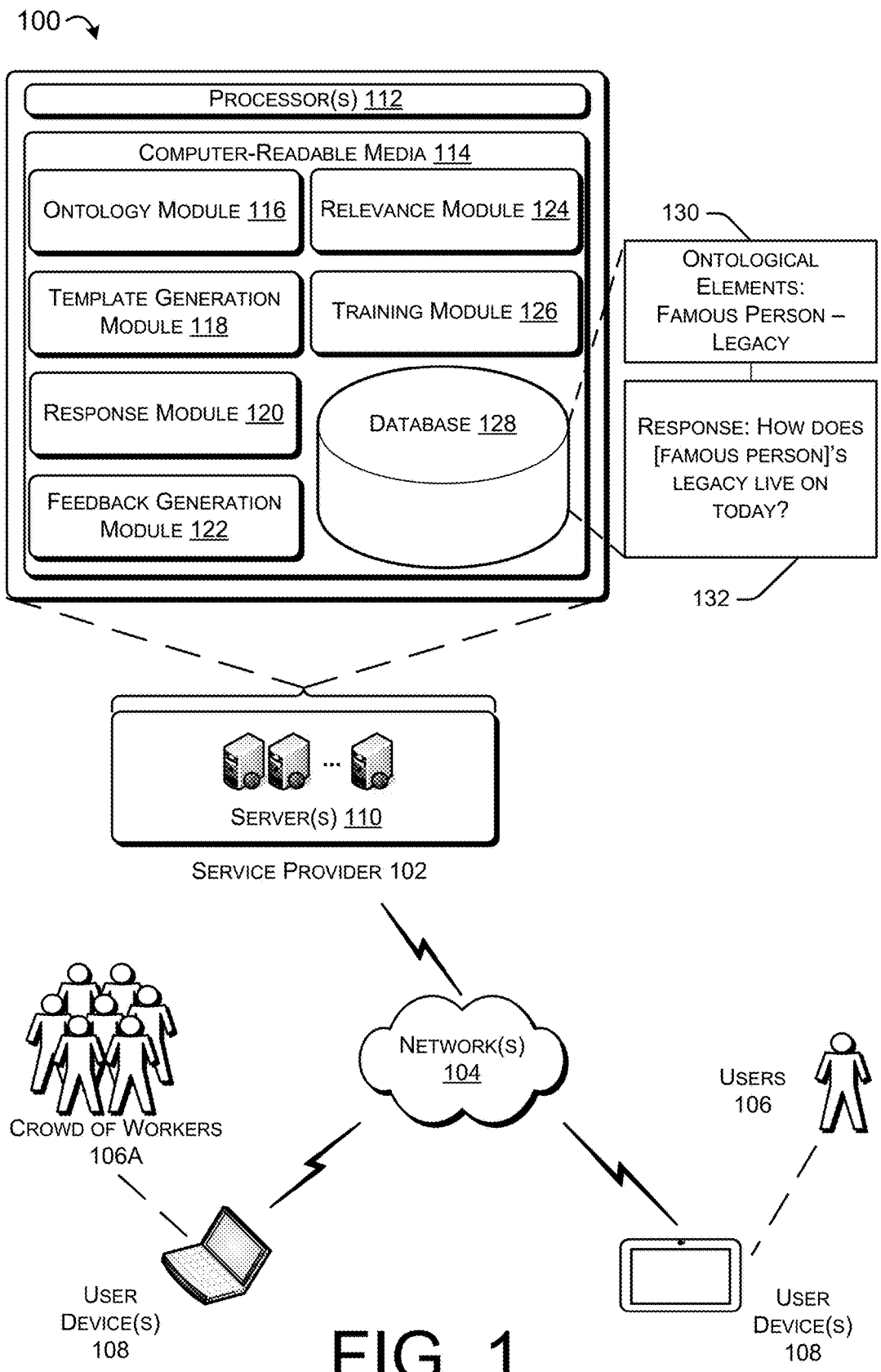
FIG. 1 is a schematic diagram showing an example environment for generating and/or providing deep responses to data inputs based on an ontology-crowd-relevance methodology.

This disclosure describes utilizing an ontology-crowd-relevance methodology to generate and/or provide deep responses to data inputs. Responses include questions, comments, annotations, etc. To generate responses, techniques described herein include determining a low-dimensional ontology of ontological elements for a plurality of data items based on analyzing the plurality of data items. The low-dimensional ontology may include one or more ontological elements. The low-dimensional ontology may be leveraged to solicit response templates aligned with the ontology from a crowd of users (e.g., a crowd of workers). The techniques herein further describe leveraging a crowd of users to determine whether response templates are relevant to data items. The relevance determination may be used for training a relevance model. As a result, the techniques described herein may generate high-level and relevant responses, without requiring full machine understanding of the input data item. That is, this disclosure describes generating deep responses without deep understanding.

For the purposes of this discussion, deep responses are high-level responses directed to significant amounts of content. Deep responses may be answerable by humans utilizing deep thinking and recall, instead of memorization. For example, deep questions associated with text are high-level questions directed to more than one sentence of text that require deep thinking and recall to answer. Deep questions differ from factoid questions, or questions that merely require a rote response associated with a fact and/or single sentence. As a non-limiting example, a deep question may ask "How does Albert Einstein's legacy live on today?," whereas a factoid question may ask "When was Albert Einstein born?" Deep questions may be open-ended queries, multiple-choice queries, etc.

As described above, the techniques described herein utilize an ontology-crowd-relevance methodology to generate and/or provide deep responses to data inputs. For the purposes of this discussion, an ontology is a low-dimensional space that is conceptually representative of a plurality of data items. An ontology, as described herein, includes one or more representative elements (i.e., ontological elements) that are hierarchically related to provide an abstraction over the content of the data item. For instance, the representative elements may be labels and sub-labels and the ontology may be a Cartesian product of labels and sub-labels. The sub-labels may nest hierarchically below the label. That is, the label may be directed to a more general concept than the sub-label. In at least one example, the label may be semantically associated with an entirety of a data item and the sub-label may be semantically associated with a portion of the data item. As a non-limiting example, in an article written about Albert Einstein, the label may be "inventor" or "famous person" and the sub-labels associated with the label may be "early life," "education," "inventions," "legacy," etc. The label-sub-label pair described herein is merely an example of two ontological elements that may make up an ontology, but the ontologies described herein may include any number of ontological elements. By using an ontology to represent data items, the techniques described herein may crowd-source high-level, re-usable response templates that generalize to many data items.

As described above, the techniques described herein streamline deep response generation utilizing the ontology-crowd-relevance methodology. The techniques described herein include accessing a plurality of data items and determining an ontology for the plurality of data items. The ontology may include one or more ontological elements. Based at least in part on determining the one or more ontological elements, the techniques herein describe sending, to a plurality of devices, a request to generate response templates based on the one or more ontological elements and receiving, from the plurality of devices, the response templates directed to the one or more ontological elements.

Additionally, as described above, the techniques described herein streamline providing deep responses using the ontology-crowd-relevance methodology. The techniques described herein include receiving a data item from a user device and extracting ontological elements from the data item. Based at least in part on extracting the ontological elements from the data item, the techniques described herein include accessing one or more response templates associated with the ontological elements and creating one or more responses based at least in part on supplementing the one or more response templates with information that is specific to the data item. In some examples two or more response templates are associated with the ontological elements and the techniques described herein further include ranking individual responses of the two or more responses based at least in part on a relevance between the individual responses and the data item and causing at least one of the ranked individual responses to be presented via the user device.

The techniques described herein affect computer operations in various ways. In at least one example, the techniques described herein conserve memory. For instance, current techniques for automatic question generation generate questions for individual sentences of text documents, resulting in multiple questions per text document that are specific to the text document. Techniques described herein generate responses for data items that are directed to larger amounts of data and are generally applicable to other data items with same ontological elements. Accordingly, the techniques described herein conserve memory by reducing the number of responses stored in the memory. In additional or alternative examples, the techniques described herein increase processing speed. As described above, the techniques described herein enable fewer, but deeper and more targeted, responses to be stored in the memory and accordingly, may enable the processors to more efficiently access and provide responses to new data items.

The ontology-crowd-relevance methodology may generate databases that store deep, interesting, and relevant response templates that generalize to various data items that are associated with the same ontologies. The ontology-crowd-relevance methodology may have various use applications. In at least one example, an electronic reading application and/or user device may send requests for responses (e.g., questions) to the service provider described below based on the page/chapter/section a user is currently reading. In such an example, the ontology-crowd-relevance methodology may be leveraged to access a database of responses (e.g., questions) that are answerable via the page/chapter/section the user is reading. Additionally or alternatively, a teacher might input a text of an article that she is teaching to her students into the service provider and request responses (e.g., questions) for the article. Or, a publisher may input parts of a textbook into the service provider and request responses (e.g., questions) for the article. In such an example, the ontology-crowd-relevance methodology may be leveraged to access a database of responses (e.g., questions) that are answerable via the article input by the teacher or the parts of the textbook by the publisher, respectively. In other examples, the ontology-crowd-relevance methodology may be utilized to generate and/or provide comments to images, videos, social media updates and/or postings, etc. Moreover, the ontology-crowd-relevance methodology may be used to generate and/or provide questions and/or comments for turns in a dialogue. Furthermore, the ontology-crowd-relevance methodology may be leveraged for annotating images, videos, etc., and/or summarizing text, images, videos, etc. The questions, comments, annotations, etc. are all examples of responses, as described above.

Illustrative Environments

FIG. 1 is a schematic diagram showing example environment 100 for generating and/or providing deep responses to data inputs based on an ontology-crowd-relevance methodology. More particularly, the example environment 100 may include a service provider 102, one or more network(s) 104, one or more users 106, and one or more user devices 108 associated with the one or more users 106. The one or more users 106 may include a crowd of workers 106A, as described below.

The service provider 102 may be any entity, server(s), platform, etc., that facilitates generating a database of response templates based at least in part on response templates authored by a crowd of workers 106A and providing at least some of the response templates to user devices 108 responsive to receiving new data items. The service provider 102 may be implemented in a non-distributed computing environment or may be implemented in a distributed computing environment, possibly by running some modules on user devices 108 or other remotely located devices. As shown, the service provider 102 may include one or more server(s) 110, which may include one or more processing unit(s) 112 and computer-readable media 114, such as memory. In various examples, the service provider 102 may access data items, determine an ontology associated with the data items, and prompt the crowd of workers 106A for response templates associated with the ontology. The crowd of workers 106A may send response templates back to the service provider 102 and the service provider 102 may store the response templates in a database. Additionally, the service provider 102 may receive a new data item and/or the ontological elements extracted from the new data item and may access the database to select and provide one or more of the response templates to a user device 108.

In some examples, the network(s) 104 may be any type of network known in the art, such as the Internet. Moreover, the user devices 108 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

In some examples, the users 106 may operate corresponding user devices 108 to perform various functions associated with the user devices 108, which may include one or more processing unit(s), computer-readable storage media, and a display. In at least one example, two or more users 106 may make up a crowd of workers 106A. The crowd of workers 106A may be a crowd of workers from a crowdsourcing platform, such as AMAZON MECHANICAL TURK® workers, GOOGLE® Answers, Collaborative Human Interpreter, etc. For the purposes of this discussion, individual users 106 in the crowd of workers 106A are workers and each worker may each operate a corresponding user device 108 to perform various functions associated with the user devices 108. User device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

Examples support scenarios where device(s) that may be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Device(s) that may be included in the one or more server(s) 110 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an ontology module, template generation module 118, response module 120, feedback generation module 122, relevance module 124, and training module 126, and other modules, programs, or applications that are loadable and executable by processing units(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that may be included in the one or more server(s) 110 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 may include components that facilitate interaction between the service provider 102 and the users 106. The components may represent pieces of code executing on a computing device. For example, the computer-readable media 114 may include the ontology module 116, template generation module 118, response module 120, feedback generation module 122, relevance module 124, training module 126, etc. In at least some examples, the modules (116, 118, 120, 124, 126, etc.) can be implemented as computer-readable instructions, various data structures, and so forth via at least one processing unit(s) 112 to configure a device to execute instructions and to perform operations implementing generating response templates that correspond to ontological elements. Functionality to perform these operations may be included in multiple devices or a single device. The computer-readable media 114 may also include a database 128 for storing response templates, as described below. As a non-limiting example, FIG. 1 shows example ontological elements 130 (i.e., famous person—legacy) and a response template 132 associated with the ontological elements.

Depending on the exact configuration and type of the server(s) 110, the computer-readable media 114 may include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Figure 2:
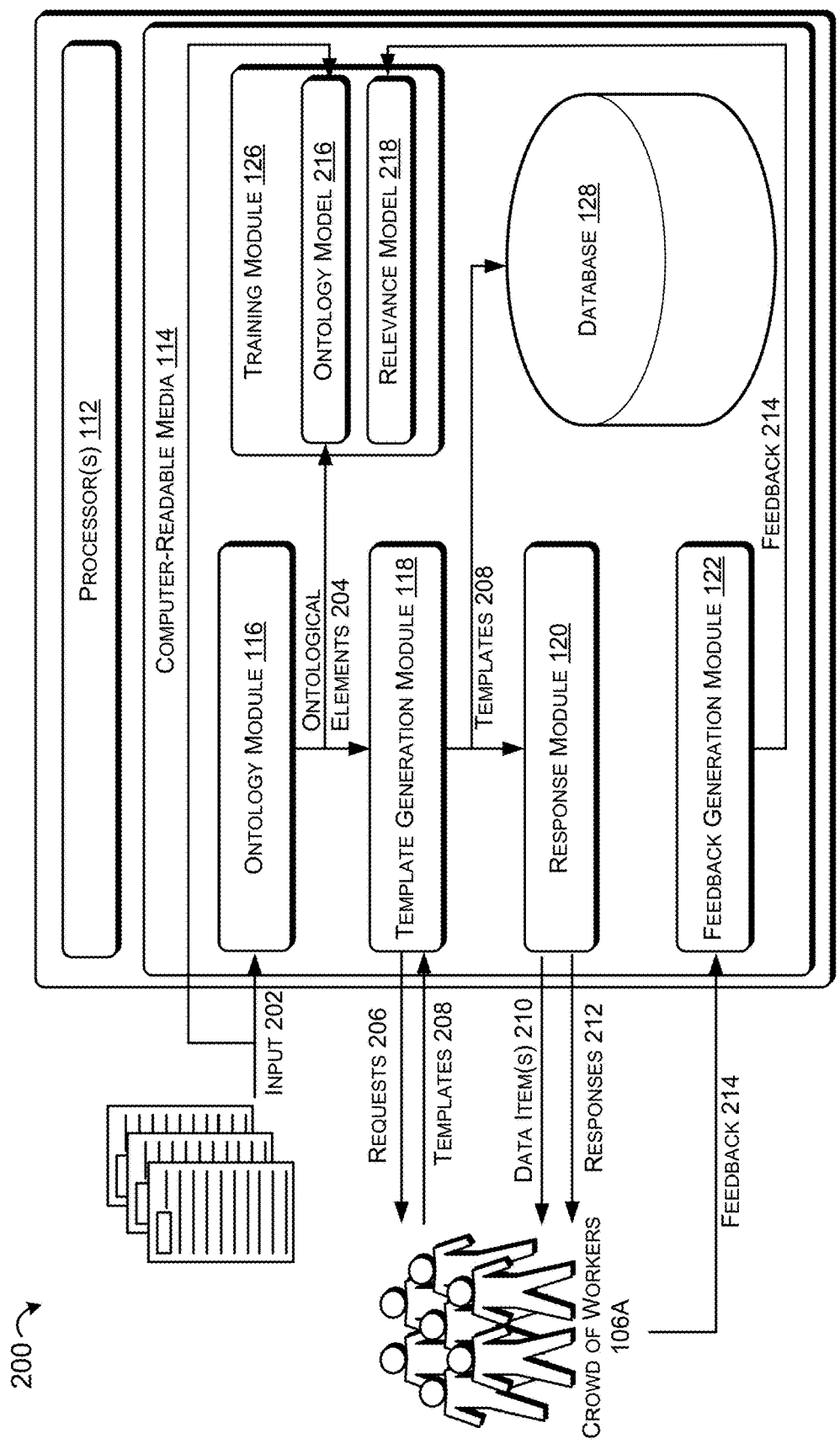
FIG. 2 is a schematic diagram showing an example environment for generating a database of response templates associated with ontological elements.

FIG. 2 is a schematic diagram showing an example environment 200 for generating a database of response templates associated with ontological elements. For the purpose of clarity, FIG. 2 omits the relevance module 124.

The ontology module 116 receives and/or accesses data items as input 202. The data items may include text data items, image data items, video data items, voice data items, etc. In some examples, the text data items may include electronic books, electronic articles, blogs, webpages, etc. In other examples, the text data items may include social media data items such as postings, updates, etc. In at least some examples, the data items may be pre-tagged with metadata corresponding to the ontological elements. The ontology module 116 may analyze the data items and may determine the ontology from the tags that correspond to the ontological elements. In other examples, the data items may not be pre-tagged. In such examples, the ontology module 116 may leverage one or more models (e.g., a classifier) to infer the ontological elements associated with the data items, for instance based on feature extraction, as described below. In some examples, the ontology module 116 may leverage the one or more models to infer additional and/or alternative ontological elements associated with pre-tagged data items. As a non-limiting example, a data item may include a tag indicating that the data item is about a famous person. The ontology module 116 may leverage the one or more models to infer that the data item is about a politician and historical figure. Accordingly, the data item may be associated with three labels: famous person, politician, and historical figure.

As described above, the ontology may be a low-dimensional space that is conceptually representative of a plurality of data items. An ontology, as described herein, includes one or more representative elements (i.e., ontological elements) that are hierarchically related to provide an abstraction over the content of the plurality of data items. In at least some examples, the ontology may be determined prior to receiving and/or accessing the data items. In other examples, the ontology may not be known. In such examples, the ontology module 116 may create an ontology using various techniques such as clustering via latent Dirichlet allocation (LDA), word clouds, etc.

The ontology module 116 may extract ontological elements 204 from the plurality of data items. As described above, the ontology module 116 may analyze the plurality of data items and may leverage tags associated with the individual data items to determine the ontology. In other examples, the ontology module 116 may leverage one or more models (e.g., a classifier) to infer the tags associated with the data items, for instance based on feature extraction, as described below. Ontological elements 130 are non-limiting examples of ontological elements 204. In at least one example, the ontological elements may include a label and a sub-label. As described above, the label may represent a broad conceptual abstraction of a data item, such as a holistic abstraction of the data item. A sub-label may represent a more narrow conceptual abstraction of a data item, such as an abstraction of a segment or section of the data item. In some examples, each label may have one or more sub-labels and each sub-label may have one or more sub-sub-labels. The response templates generated by the crowd may become more specific as the number of sub-labels, sub-sub-labels, etc. increase. In at least one example, the label may represent a category associated with a text document and the sub-label may represent a section within the text document. In such an example, the sub-label may have sub-sub-labels associated with a sub-section of the section.

For instance, an encyclopedia may be associated with an ontology including label-sub-label ontological elements 204. As non-limiting examples, the labels may include "persons," "locations," "events," "organizations," "arts," "sciences," "health," "religion," etc. Sub-labels for the label "person" may include "early life," "career," "personal life," "biography," etc. In such an example, the ontologies may be made of at least two ontological elements 204: person—early life, person—career, person—personal life, person—biography, etc.

In another example, social media postings or updates may be associated with an ontology including a one or more ontological elements 204. As non-limiting examples, labels may include "life event," "friends," "photos," "articles," etc. Sub-labels for the label "life event" may include, "engagement," "wedding," "baby," etc. In some examples, the sub-labels may have sub-labels nested hierarchically below the sub-labels. For instance, the sub-sub-label for the sub-label "wedding," may include "groom," "bride," "flower girls," "cake," "venue," etc.

The ontology module 116 may send the ontological elements 204 to the template generation module 118 and/or the training module 126.

The template generation module 118 may receive and/or access the ontological elements 204 and may generate a request 206 associated with the ontological elements 204. The request 206 may include a request for a response template 208 associated with the ontological elements 204. The request 206 may be associated with generic request templates stored in the database 128. The text of the generic request templates may vary based on different types of data input. For instance, text in a generic request template for generating a response template 208 associated with an article may be different from text in a generic request template for generating a response template 208 associated with a photo. The generic request templates may have one or more slots configured to be filled with ontological elements 204. The template generation module 118 may fill the slots with corresponding ontological elements 204 to generate a request 206 for the ontological elements 204. As a non-limiting example, the ontological elements 204 may be famous person—early life and the corresponding request may request a response template about the early life of a famous person. For instance, the request 206 may present the text of: "Suppose you have just finished reading article about a famous person named X. Suppose you have just finished reading the early life section in the article. Your task is to write a follow-up question about the early life section in this article about X." Of course, the requests 206 may include additional or alternative language to prompt the crowd of workers 106A to author response templates 208.

The template generation module 118 may send the request 206 to the user devices 108 associated with the crowd of workers 106A. The crowd of workers 106A may author response templates 208 directed to the ontological elements 204. The crowd of workers 106A need not have read, viewed, etc. the data item to author the response templates 108. The crowd of workers 106A may be specially trained so that the workers in the crowd of workers 106A know what response templates 208 are appropriate and/or how to provide appropriate types of feedback, as described below. The response templates 208 may be generic, such that they are generally applicable to data items that are associated with the same ontological elements 204. The response templates 208 may include one or more slots that are configured to be replaced with information specific to a particular data item to generate a response specific to the particular data item. Response template 132 is a non-limiting example of a response template 208.

As another non-limiting example, with respect to the ontological elements 204 described above (i.e., famous person—early life), a worker in the crowd of workers 106A may author a response template such as "In what ways was [famous person] influenced in their early life that lead to their successes in their later life?" In this example, [famous person] is a slot that may be replaced with data item-specific information. For instance, if the data item is an article about Albert Einstein, "Albert Einstein" may replace [famous person] so that the question reads: "In what ways was Albert Einstein influenced in their early life that lead to their successes in their later life?"

As discussed above, the response templates 208 may be generic, such that they are generally applicable to data items that are associated with the same ontological elements 204. For instance, the example question above (i.e., "In what ways was [famous person] influenced in their early life that lead to their successes in their later life?") may apply to a variety of data items having the same famous person—early life ontological elements 204. Accordingly, the same response could be used for other data items associated with famous people such as Abraham Lincoln, George W. Bush, Beyoncé, etc.

The crowd of workers 106A may send the response templates 208 back to the template generation module 118. The template generation module 118 may send the response templates 208 to the response module 120 and/or the database 128.

The response module 120 may receive and/or access the response templates 208 and may generate responses 212 by supplementing the slots associated with the individual response templates 208 with data item-specific information as described above. The response module 120 may send the responses 212 and one or more data items 210 associated with the ontological elements 204 to the crowd of workers 106A for feedback 214. The workers in the crowd of workers 106A who provide feedback 214 may be the same workers as the workers who authored the response templates 208, or they may be different workers from the workers who authored the response templates 208.

The workers in the crowd of workers 106A may evaluate each of the responses 212 in view of one or more data items 210 associated with the ontological elements 204 to determine whether the responses 212 are relevant to the one or more data items 210. In some examples, the workers in the crowd of workers 106A may provide a relevance score representing a degree of relevance of a response 212 to a data item 210. For instance, a relevance score of 0 may indicate that a response 212 directed to one or more ontological elements 204 is not relevant to a data item 210 associated with the one or more ontological elements 204 and a relevance score of 1 may indicate that the response 212 was relevant to the data item 210. In some examples, computerized techniques may be leveraged to determine whether a response 212 associated with particular ontological elements 204 is relevant to a data item 210 with the ontological elements 204.

In at least one example, workers in the crowd of workers 106A may consider a response 212 that is a question and may determine whether a text document answers the question. In at least one example, if the text answers the question, the question is relevant and the worker may assign the question a relevance score close to 1. If the text does not answer the question, the question is not relevant and the worker may assign the question a relevance score close to 0. In another example, workers may consider a response 212 that is a comment (e.g., in response to a social media update or post) and may determine whether the comment is relevant to a data item 210 such as a photo, video, social media update, etc.

In addition to determining whether a response 212 is relevant to a data item 210, the workers in the crowd of workers 106A may determine the quality of the responses 212, the depth of the responses 212, etc. The workers may assign quality scores and/or depth scores representative of a degree of quality and/or depth of a response 212, respectively. In an example, quality scores may range from 0 to 1, whereby a quality score of 0 represents a poorly written response 212 and a quality score of 1 represents a well-written response 212. Additionally or alternatively, depth scores may range from 0 to 1, whereby a depth score close to 0 may indicate that the response 212 has a short answer that does not require recall or understanding, and a depth score of 1 indicates that the response 212 has a relatively long answer that requires recall and understanding of the data item. Additional or alternative scoring mechanism may also be used. In some examples, computerized techniques may be leveraged to determine quality and/or depth scores.

The crowd of workers 106A may send the relevance score, quality score, depth score, etc. back to the feedback generation module 122 as feedback 214. The feedback generation module 122 may send the feedback 214 to the training module 126 for training relevance models.

The training module 126 may train an ontology model 216 and a relevance model 218. The ontology module 116 may leverage the ontology model 216 to infer (e.g., predict) ontological elements 204 from data items. In at least one example, the ontology model 216 may be a classifier that may infer ontological elements 204 based at least in part on extracting features from the data items and comparing the extracted features to features of other data items by means of a similarity or distance function. In some examples, the same ontology model 216 may include individual classifiers for each ontological element 204. The ontology module 116 may apply the individual classifiers on each of the data items to determine the ontological elements 204 associated with the data item. The ontology module 116 may assign a confidence score to each resulting ontological element, as described below. The relevance module 124 may leverage the relevance model 218 to determine which response templates 208 from the database 128 are related (i.e., actually apply) to a particular data item. In at least one example, the relevance model 218 may be a classifier that may predict the relatedness between a response template 208 and a particular data item based at least in part on extracting features from the data items and comparing the extracted features to features of other data items by means of a similarity or distance function.

The training module 126 may access pre-tagged data items for training the ontology model 216. The ontology model 216 may include classifiers for each ontological element. Label classifiers may be trained on an entirety of a data item. Sub-label classifiers may be trained on individual sections of a data item. The classifiers may include Logistic Regression classifiers, Gaussian Naïve Bayes classifiers, Deep Neural Networks, etc. In at least one example, logistic regression with a default L2 regularization parameter in LIBLINEAR may be used for training the classifiers. Additionally, a binary data set may be constructed for a one-against-all evaluation, where negative instances may be sampled randomly from negative categories or sections. The training module 126 may leverage basic tfidf features for training the classifiers. Additional or alternative features may be used as well.

The training module 126 may access and/or receive feedback 214 from the crowd of workers 106A. As described above, the feedback 214 may include a relevance score indicating the relatedness between individual data items 210 and responses 212. The training module 126 may convert the relevance score into a binary relevance rating for training the relevance model 218. The binary relevance rating may indicate that a response 212, and corresponding feature vector, is relevant or not relevant. The relevance score and/or binary relevance rating may be mapped to each data item-response pair. The training module 126 may extract features from each data item-response pair and may determine component-wise Euclidean distances between individual features of the data item-response pair. In at least one example, the training module 126 may utilize a feature vector of the component-wise Euclidean distances between individual features of the data item-response pair, i.e., the $i^{th}$ feature vector component $f_i$ is given by $f_i=(q_i-a_i)^2$, where $q_i$ and $a_i$ are components of the response ($q_i$) and data item ($a_i$) feature vectors. The features may include continuous embedding features such as Word2Vec embedding features, tfidf features, etc.

In some examples, the training module 126 may augment the feature vector by concatenating additional distance features between the data item and another data item. The other data item may be a data item 210 to which the response 212 has already been compared and a relevance score and/or binary relevance rating already determined. The relevance score may be above a predetermined threshold such to indicate that the response 212 is highly relevant to the data item 210. Additionally or alternatively, the binary relevance rating may indicate that the response 212 is relevant to the data item 210. The training module 126 may determine another feature vector representative of the distances between the data item and the second data item via the same process as described above. The training module 126 may combine the feature vectors to generate a combined, or concatenated, feature vector. The training module 126 may then leverage the concatenated feature vector, the data item 210, and the response 212 to train the relevance model 218. The other data item used for augmenting the feature vector may be excluded from training the relevance model 218. The relevance model 218 may be a classifier such as a Logistic Regression classifier, Gaussian Naïve Bayes classifier, Deep Neural Network, etc. In at least one example, the training module 126 may train the relevance model 218 using a logistic regression model with the LIBLINEAR with default L2 regularization.

The database 128 may store at least some of the response templates 208. In at least one example, the database 128 may map each of the response templates 208 to corresponding ontological elements 204. Accordingly, the response module 120 may access response templates 208 that are mapped to ontological elements 204 based at least in part on receiving a new data item and extracting the ontological elements 204 from the new data item. Additionally, the database 128 may map each of the ontological elements 204 to the data items of which they are associated.

The ontology-crowd-relevance methodology described above may have a variety of use applications. In one example, the input 202 may include a plurality of text documents, such as electronic articles, electronic books, etc. The ontology module 116 may extract the ontology (i.e., one or more ontological elements 204) from the text documents. In such an example, the ontological elements 204 may include a label element corresponding to a category that is semantically associated with an entirety, or substantial majority, of the text document and a sub-label element corresponding to a section that is semantically associated with a portion of the text document. As a non-limiting example, a history text book may have several sections about Presidents, famous politicians, etc., and each section about each of the persons may discuss the person's early life, education, life before political career, political influence, life after political career, etc. Accordingly, an example ontology of one or more ontological elements 204 may be famous person—early life or famous person—education.

The ontology module 116 may send the ontological elements 204 to the template generation module 118. The template generation module 118 may send requests 206 to the crowd of workers 106A for question templates (e.g., response templates 208) associated with the category-section ontological elements 204. In the non-limiting example above, the request 206 may present the text of: "You've finished reading about famous person named X. Please write a question about the early life of X." The crowd of workers 106A may generate a plurality of question templates directed to the category-section ontological elements 204 and may send the plurality of question templates to the template generation module 118. In the non-limiting example, a question template may include, "What events in the early life of [person X] prepared them for their successes?" The template generation module 118 may provide the question templates to the response module 120 and/or the database 128. As a result, the database 128 may include a plurality of deep, interesting, and relevant question templates whose answers span more than a single sentence of the text document and that generalize to other text documents with the same ontological elements 204. For instance, the same question template may be used to ask a question about President Lincoln, President Kennedy, President George W. Bush, etc.

The response module 120 may access individual text documents and may supplement the question templates 208 with information specific to the individual text documents to generate questions (e.g., responses 212) specific to the individual text documents. The response module 120 may send the individual text documents and the questions to the crowd of workers 106A, as described above. The crowd of workers 106A may determine whether the individual text documents answer the corresponding questions and may provide a relevance score for the text document-question pair. Additionally, the crowd of workers 106A may determine quality and/or depth scores for the questions. The crowd of workers 106A may provide the relevance scores, quality scores, and/or depth scores to the feedback generation module 122 as feedback 214 and the feedback generation module 122 may provide the feedback 214 to the training module 126 to train the relevance model 218, as described above.

In another example, the input 202 may be social media updates. The ontology module 116 may extract ontological elements 204 from the social media updates. For instance, as a non-limiting example, some of the social media updates may be about engagements. The ontology module 116 may determine the ontological elements 204 to be life event—engagement. The ontology module 204 may send the ontological elements 204 to the template generation module 118. The template generation module 118 may send requests 206 to the crowd of workers 106A for response templates 208 to the social media update. For instance, the request 206 may prompt the crowd of workers 106A for a comment that the workers in the crowd of workers 106A would make to someone who just announced that they were engaged. As a non-limiting example, the request 206 may present the text: "You've learned that X just got engaged. Write a comment and/or question that you would say to X." The crowd of workers 106A may author comment and/or question templates (e.g., response templates 208) and send the comment and/or question templates back to the template generation module 118. For instance in the non-limiting example, workers in the crowd of workers 106A may author comments such as, "Congratulations [X]! I can't wait to see what you have in store for your big day!," "I'm so excited for you two! I can't think of a cuter couple!," or "Yay! This is such great news, [X]! Let's see the ring!" In some examples, the template generation module 118 may passively observe comments posted by users 106 in response to other social media updates with the same ontological elements 204 (e.g., life event—engagement) and may author comment and/or question templates based on the comments posted by the users 106. The template generation module 118 may send the comment and/or question templates to the response module 120 and/or database 128. As a result, the database 128 may include a plurality of deep, interesting, and relevant comment and/or question templates that generalize to other social media updates with the same ontological elements 204. In the non-limiting example, the database 128 may have a plurality of comment and/or question templates that may be accessed and used to respond to a social media posting about an engagement without regard to who is posting.

The response module 120 may supplement the comment and/or question templates with information specific to a social media update to generate a comment and/or question (e.g., response 212). The response module 120 may leverage the crowd of workers 106A to receive feedback 214 about the relevance of the comment and/or question to the social media update and may leverage the feedback 214 to train a relevance module 214 as described above.

In yet another example, the input 202 may be images. The ontology module 116 may extract ontological elements 204 from the images. For instance, as a non-limiting example, an image may depict an animal in a forest, and the ontology module 116 may determine the ontological elements 204 to be outdoor scene—animal. The ontology module 116 may send the ontological elements 204 to the template generation module 118. The template generation module 118 may send requests 206 to the crowd of workers 106A for templates for annotating the image and/or template questions (e.g., response templates 208) about the image to extract information about the image. In the non-limiting example, a request 206 may present the text: "You are observing a picture of an animal in an outdoor scene. Write a question you want to ask the photographer." The crowd of workers 106A may author the response templates 208. For instance, in the non-limiting example, a response template 208 may include a comment such as "Oh my! How did you come across the [animal]?" or "This is a great picture of [animal]. Where were you?" The crowd of workers 106A may send the response templates 208 to the template generation module 118. In some examples, the template generation module 118 may passively observe annotations and/or questions by users 106 in response to other images with the same ontological elements 204 (e.g., outdoor scene—animal) and may author annotation and/or question templates based on the comments posted by users 106. The template generation module 118 may send the response templates 208 to the database 128 and/or the response module 120. As a result, the database 128 may include a plurality of deep, interesting, and relevant annotation and/or question templates that generalize to other images with the same ontological elements 204. In the non-limiting example, the database 128 may store a plurality of annotation and/or question templates that may be applicable to a plurality of images that include the ontological elements 204 outdoor scene—animal, regardless of the location of the outdoor scene or the animal in the photo. For instance, the same comment "That is a great picture of [animal]. Where were you?" may be applicable to a picture of a horse on a farm or a bear in the woods.

The response module 120 may supplement the templates for annotating an image and/or template questions about the image to extract information about the image to personalize the response templates 208 for the image. As described above, the feedback generation module 122 may receive feedback 214 from the crowd of workers 106A. The feedback 214 may include a relevance score, indicating a relevance between the annotations and/or questions (e.g., responses 212) and the image. The feedback 214 may be used to train a relevance model 218.

Figure 3:
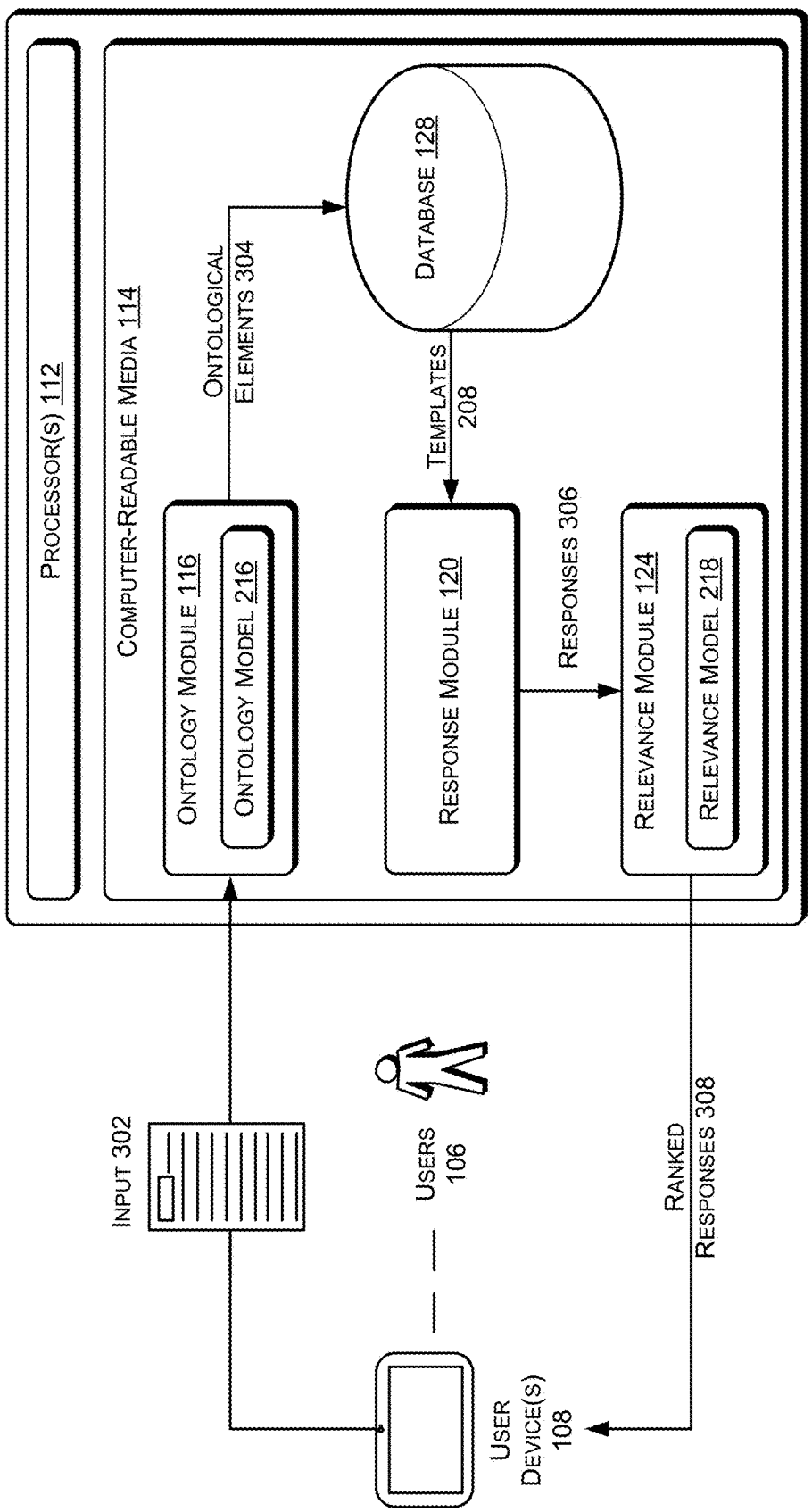
FIG. 3 is a schematic diagram showing an example environment for providing deep responses to inputs.

FIG. 3 is a schematic diagram showing an example environment 300 for providing deep responses to inputs. For the purpose of clarity, FIG. 3 omits the template generation module 118, the feedback generation module 122, and the training module 126.

The ontology module 116 may receive an input 302. In some examples, a user device 108 may send an input 302 to the service provider 102. In other examples, the service provider 102 may access the input 302. As described above, the input 302 may be a data item such as a text document, image, video, etc. The ontology module 116 may determine ontological elements 304 associated with the input 302. In some examples, the input 302 may be tagged and the ontology module 116 may extract the ontological elements 304 from the tagged input. In additional or alternative examples, the ontology module 116 may apply the ontology model 216 to infer the ontological elements 304. In at least one example, the ontology module 116 may apply the ontology model 216 to a tagged data item 302 to determine additional or alternative ontological elements 304. In some examples, more than one set of ontological elements 304 may be associated with each input 302. In such examples, the ontology module 116 may determine confidence scores associated with each set of ontological elements 304 representative of a likelihood that the set of ontological elements 304 accurately represents the data item.

The ontology module 116 may send the ontological elements 304 to the database 128 and/or the database 128 may otherwise access the ontological elements 304. The database 128 may access one or more response templates 208 that are mapped to the ontological elements 304. In an example where more than one set of ontological elements 304 may be associated with an input 302, the database 128 may access response templates 208 associated with each set of ontological elements 304. In at least one example, the database 128 may access response templates 208 associated with each set of ontological elements 304 proportional to the confidence scores. The database 128 may send the one or more response templates 208 to the response module 120.

The response module 120 may supplement the response templates 208 with information specific to the input 302. For instance, the response templates 208 may include one or more slots configured to be filled in with information specific to an input 302 to generate a response 306 specific to the input 302. As a non-limiting example, a response template 208 may ask the question: "How does [famous person]'s legacy live on today?" For an article about Albert Einstein, the response module 120 may supplement the slot [famous person] with "Albert Einstein" so the response 306 asks the question: "How does Albert Einstein's legacy live on today?"

The response module 120 may send the responses 306 to the relevance module 124. The relevance module 120 may apply the relevance model 218 to each of the responses 306 to determine whether the response 306 is relevant to the input 302. Based at least in part on applying the relevance model 218, the relevance module 124 may rank the responses 306 based at least in part on how relevant each response 306 is to the data item. The relevance module 124 may cause the ranked responses 308 to be presented to a user 106 via a user device 108. In some examples, the relevance module 124 may send a predetermined number of top ranked responses 308 to the user device 108. In other examples, the relevance module 124 may send a number of ranked responses 308 above a predetermined threshold to the user device 108.

As described above, the ontology-crowd-relevance methodology described above may have a variety of use applications. In one example, a user 106 may input a text document, such as an electronic article, electronic book, etc. The ontology module 116 may extract ontological elements 304 from the text document. The database 128 may receive and/or access the ontological elements 304 and may access the question templates 208 mapped to the ontological elements 304. The response module 120 may supplement the question templates 208 with information specific to the individual text documents to generate questions (e.g., responses 306) specific to the individual text documents.

The response module 120 may send the questions to the relevance module 124. The relevance module 124 may leverage the relevance model 218 to rank the questions based at least in part on how well the questions can be answered using the text document and may cause the ranked questions (e.g., ranked responses 308) to be presented on the user device 108. As a result, the user 106 may have two or more ranked questions that are deep, interesting, and relevant to the text document and are answerable using more than a single sentence of text in the text document. A teacher and/or student desiring to generate a quiz on a particular corpus of text may utilize this methodology to generate deep questions based on the particular corpus text. The teacher and/or student may access the ranked questions and may select individual of the ranked questions to include in the quiz about the corpus of text.

In another example, a user 106 may post a social media update. The ontology module 116 may extract ontological elements 204 from the social media update. The database 128 may receive and/or access the comment templates (e.g., response templates 208) mapped to the ontological elements 304. The response module 120 may supplement the comment templates with information specific to the social media update to generate a comment (e.g., response 306). The response module 120 may send the comments to the relevance module 124. The relevance module 124 may leverage the relevance model 218 to rank the comments and may cause the ranked comments (e.g., ranked responses 308) to be presented on the user device 108. As a result, the user 106 may be presented with a plurality of deep, interesting, and relevant comments. In some examples, the relevance module 124 may cause the comments to be presented such that the user 106 can actuate a control on a user interface associated with the comments to post individual of the comments without further user interaction.

In yet another example, a user 106 may input an image. The ontology module 116 may extract ontological elements 304 from the image. The database 128 may access and/or receive the annotation and/or question templates (e.g., response templates 208) mapped to the ontological elements 304. The response module 120 may supplement the annotations and/or question templates with information specific to the image to generate an annotation and/or question. The response module 120 may send the annotations and/or questions (e.g., responses 306) to the relevance module 124. The relevance module 124 may leverage the relevance model 218 to rank the comments and may cause the ranked annotations and/or questions (e.g., ranked responses 308) to be presented on the user device 108. As a result, the user 106 may be presented with a plurality of deep, interesting, and relevant annotations and/or questions associated with the image.

In additional, or alternative, examples, the comments, annotations, questions, etc. may be utilized by a virtual assistant (e.g., Cortana®, Siri®, etc.) to interact with a user 106 of a user device 108. In at least one non-limiting example, a user 106 may post a photo on social media or take a photo using his or her user device 108. The ontology module 116 may extract the ontological elements 304 and the response module 120 may access one of the response templates 208 from the database 128. The response module 120 may supplement the response template 208 with information specific to the photo to generate a response 306. The virtual assistant may utilize the response 306 to interact with the user 106 via the user device 108. For instance, the virtual assistant may ask the user 106 personalized questions for annotating the photo or provide a personalized comment responsive to a user 106 posting the photo. In the example, the user 106 may post a photo of an engagement ring. Using the techniques described herein, a virtual assistant may comment, "That ring is beautiful! Tell me the story!" Leveraging comments, annotations, questions, etc. that are authored by the crowd of workers 106A enables the virtual assistant to have more meaningful and realistic interactions with users 106.

Example Processes

The processes described in FIGS. 4-8 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
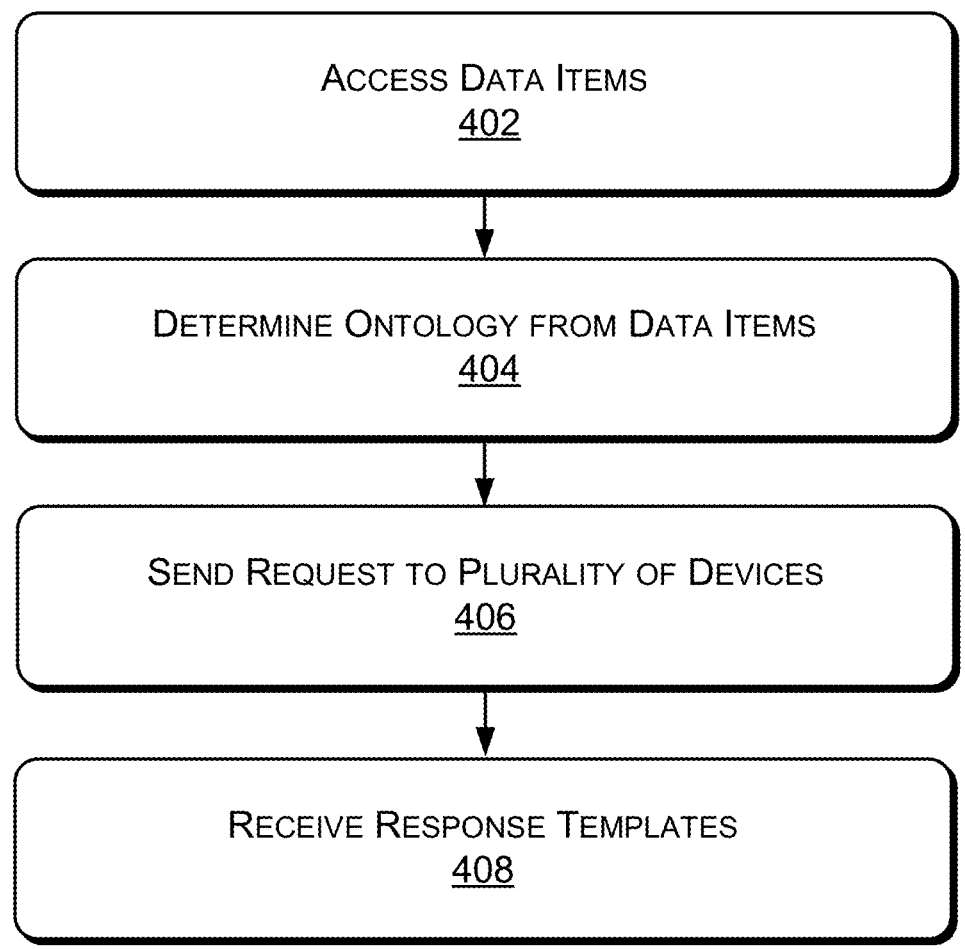
FIG. 4 is a flow diagram that illustrates an example process to generate response templates.

FIG. 4 is a flow diagram that illustrates an example process 400 to generate response templates 208.

Block 402 illustrates accessing data items 202. The ontology module 116 receives and/or accesses data items as input 202, as described above.

Block 404 illustrates determining an ontology from the data items. The ontology module 116 may determine an ontology from the data items as described above. The ontology may include one or more ontological elements 204. In at least one example, the ontological elements 204 may be associated with a label and a sub-label. As described above, the label may represent a broadest conceptual abstraction of a data item. A sub-label may represent a more narrow conceptual abstraction of a data item, such as an abstraction of a segment or section of a data item. In at least one example, the label may represent a category associated with a data item and the sub-label may represent a section within the data item. Some data items may be pre-tagged. Other data items may not be pre-tagged. Accordingly, in at least some examples, the ontology module 116 may apply an ontology model 216 to infer the ontological elements 204, as described above.

Block 406 illustrates sending a request 206 to a plurality of devices. The template generation module 118 may receive and/or access the ontological elements 204 and may generate a request 206 associated with the ontological elements 204. The request 206 may include a request for a response template 208 associated with the ontological elements 204. The template generation module 118 may send the request 206 to a plurality of devices. In some examples, the plurality of devices may be user devices 108 associated with a crowd of workers 106A, as described above. The crowd of workers 106A may author response templates 208 directed to the ontological elements 204. The response templates 208 may be generic, such that they are generally applicable to data items that are associated with the same ontological elements 204, as described above.

Block 408 illustrates receiving response templates 208. The plurality of devices may send the response templates 208 back to the template generation module 118. The template generation module 118 may send the response templates 208 to the response module 120. As described above, the response module 120 may receive and/or access the response templates 208 and may supplement the slots with data item-specific information as described above. The response module 120 may send the responses 212 to user devices 108 associated with the crowd of workers 106A for feedback 214. The feedback 214 may include a relevance score, quality score, depth score, etc. The feedback 214 may be leveraged to train the relevance model 218 as described above and also below in FIG. 5. Additionally or alternatively, the template generation module 118 may send the response templates 208 to the database 128. The database 128 may map each of the response templates 208 to the ontological elements 204.

Figure 5:
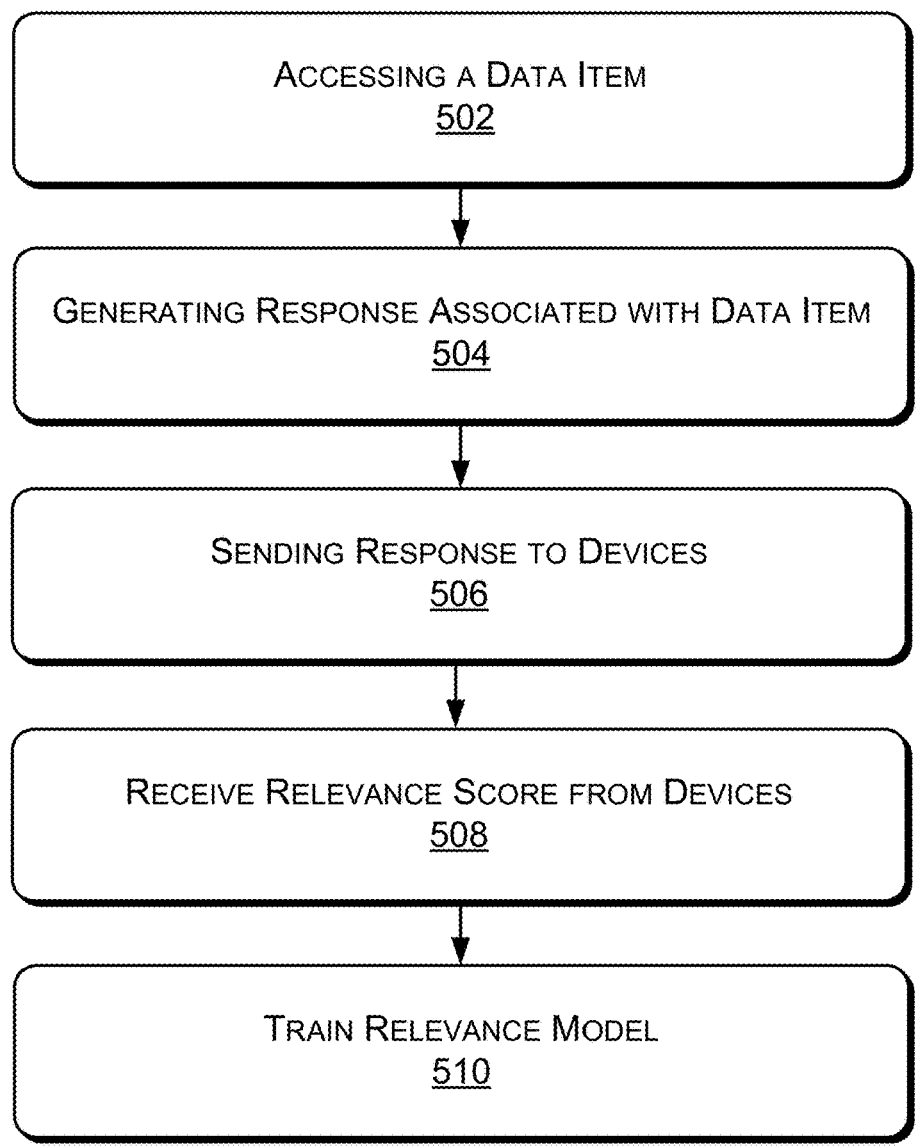
FIG. 5 is a flow diagram that illustrates an example process to receive feedback and leverage the feedback to train a relevance model.

FIG. 5 is a flow diagram that illustrates an example process 500 to receive feedback 214 and leverage the feedback 214 to train a relevance model 218.

Block 502 illustrates accessing a data item. The response module 120 may select a data item from the input 202. In some examples the response module 120 may select the data item randomly. In other examples, the response module 120 may select the data item based on specific criteria or events. The data item may be mapped to particular ontological elements 204.

Block 504 illustrates generating a response 212 associated with the data item. The response module 120 may access a response template 208 from the database 128 that is mapped to the particular ontological elements 204. The response module 120 may supplement the response template 208 with information specific to the data item, as described above, to generate a response 212.

Block 506 illustrates sending the response 212 to a plurality of devices. The response module 120 may send the response 212 and the data item to a plurality of devices for feedback 214. In some examples, the plurality of devices may be user devices 108 associated with the crowd of workers 106A. The workers in the crowd of workers 106A may evaluate the response 212 in view of the data item associated with the ontological elements 204 to determine whether the response 212 is relevant to the data item. In addition to determining whether the response 212 is relevant to the data item, the workers in the crowd of workers 106A may determine the quality of the response 212, the depth of the response 212, etc., as described above.

Block 508 illustrates receiving a relevance score from the plurality of devices. The crowd of workers 106A may send the relevance score, quality score, depth score, etc. back to the feedback generation module 122 as feedback 214. The feedback generation module 122 may send the feedback 214 to the training module 126 for training the relevance model 218, as described above.

Block 510 illustrates training a relevance model 218. The relevance score may be mapped to each data item-response pair. The training module 126 may extract features from the data item-response pair and may determine component-wise Euclidean distances between individual features of the data item-response pair, as described above. The component-wise Euclidean distances between individual features may be associated with a feature vector. In some examples, the training module 126 may augment the feature vector by concatenating additional distance features between the data item and another data item, as described in FIG. 6 below. The relevance model 218 may be a classifier such as a Logistic Regression classifier, Gaussian Naïve Bayes classifier, Deep Neural Network, etc.

Figure 6:
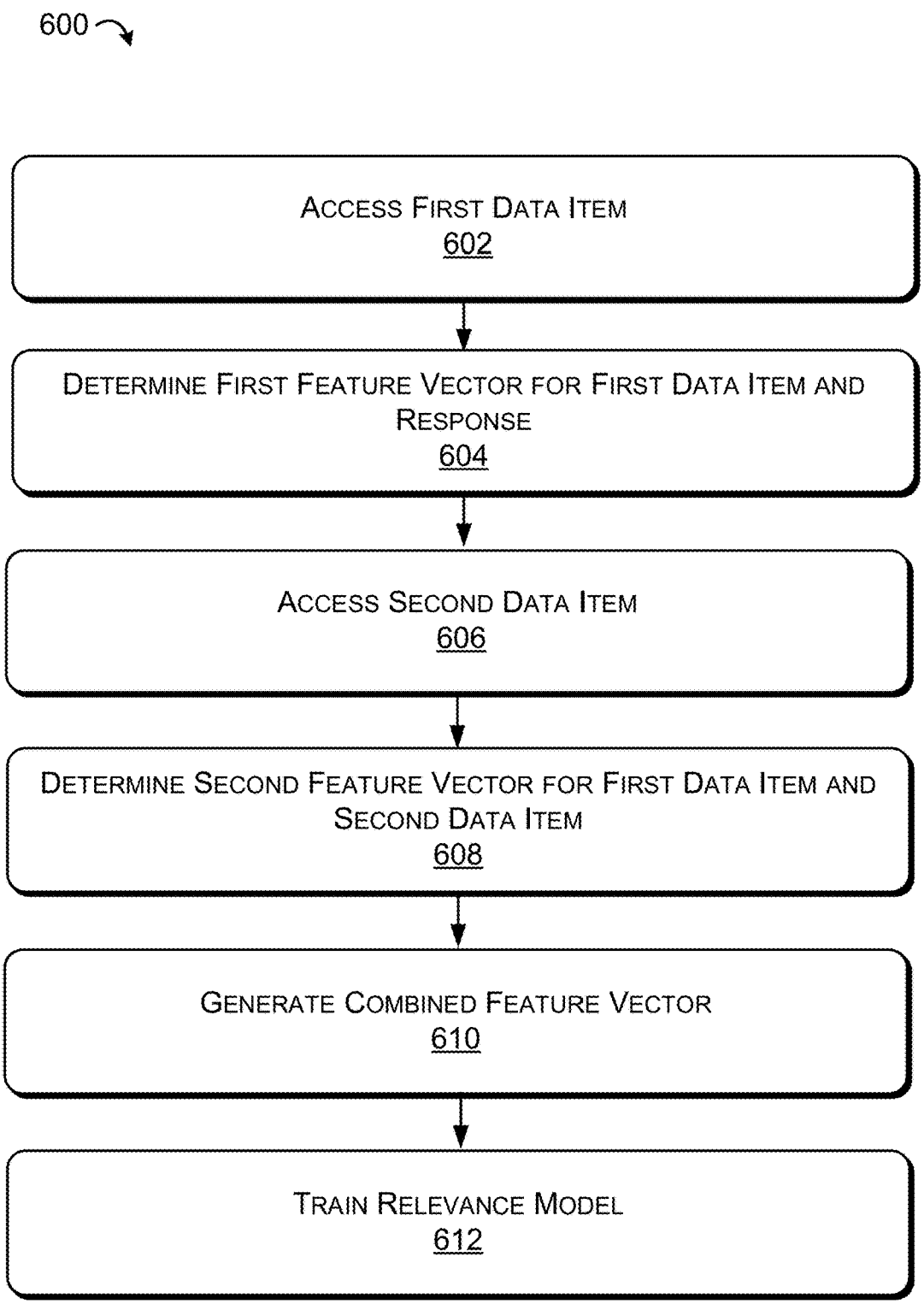
FIG. 6 is a flow diagram that illustrates another example process to train a relevance model.

FIG. 6 is a flow diagram that illustrates another example process 600 to train a relevance model 218.

Block 602 illustrates accessing a first data item. The first data item represents the data item for which the training module 126 desires to determine a feature vector to train the relevance model 218. The response module 120 may select a first data item from the input 202. The data item may be mapped to particular ontological elements 204.

Block 604 illustrates determining a first feature vector for the first data item and a response 212. The training module 126 may extract features from the first data item-response pair and may determine component-wise Euclidean distances between individual features of the first data item and response 212, as described above. The component-wise Euclidean distances between the individual features may be associated with a first feature vector.

Block 606 illustrates accessing a second data item. The second data item represents the data item that may be used to augment the first feature vector. The second data item may be a data item to which the response 212 has already been compared and a relevance score already determined. The relevance score may be above a predetermined threshold such to indicate that the response 212 is highly relevant to the second data item. That is, the binary relevance rating may indicate that the response 212 is relevant to the second data item. The response module 120 may select the second data item from all data items that have a relevance score above a predetermined threshold.

Block 608 illustrates determining a second feature vector for the first data item and the second data item. The training module 126 may extract features from the first data item-second data item pair and may determine component-wise Euclidean distances between individual features of the first data item and the second data item, as described above. The additional distance features may be determined in a same manner as described above. The component-wise Euclidean distances between the individual features may be associated with a second feature vector.

Block 610 illustrates generating a combined feature vector. In some examples, the training module 126 may augment the feature vector by concatenating additional distance features between the first data item and second data item (i.e., the second feature vector) to the distance features determined for the first data item-response pair (i.e., the first feature vector) to generate a combined feature vector.

Block 612 illustrates training a relevance model 218. The training module 126 may leverage the concatenated feature vector to train the relevance model 218, as described above.

Figure 7:
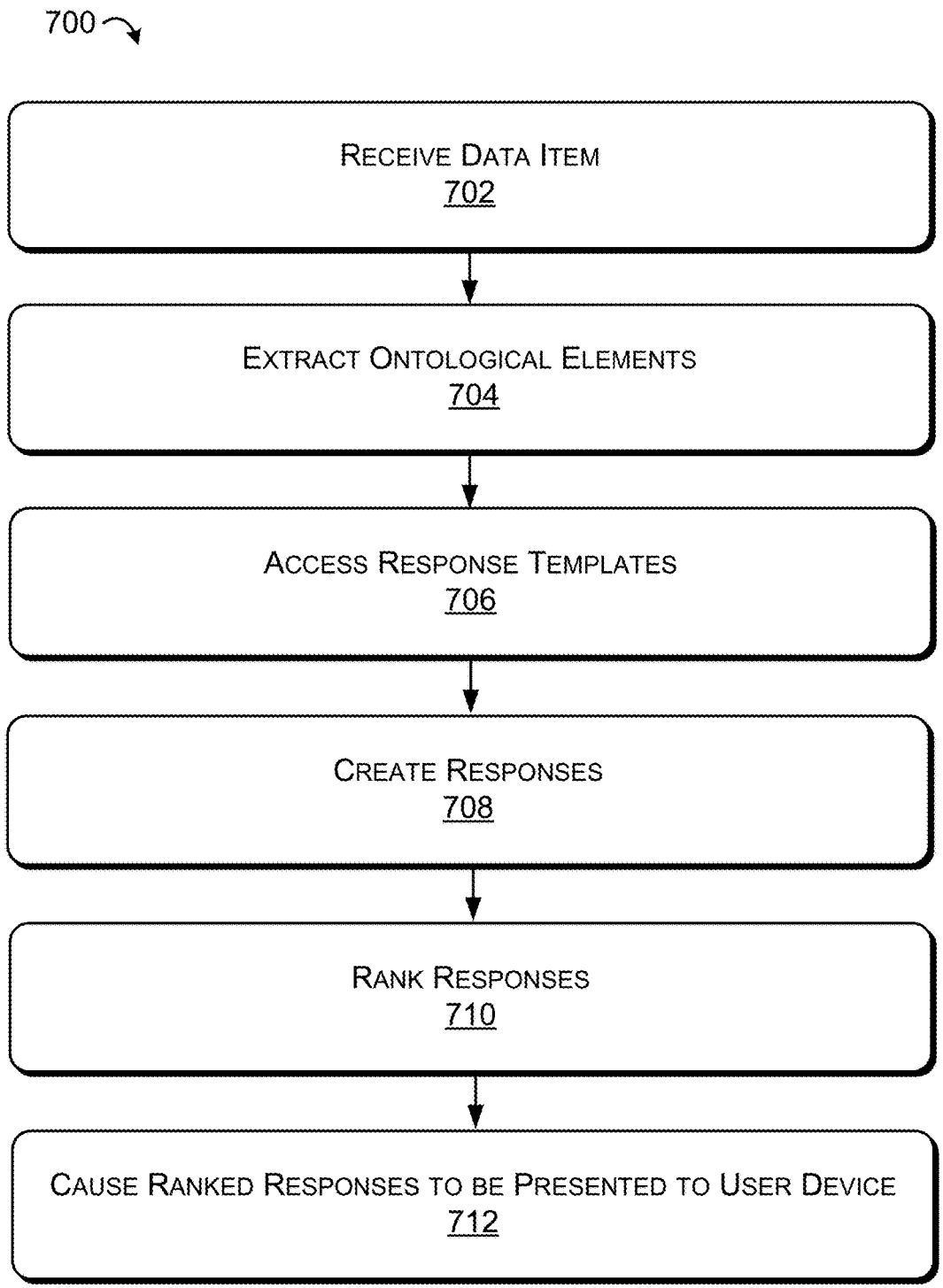
FIG. 7 is a flow diagram that illustrates an example process to cause deep responses to be presented to a user.

FIG. 7 is a flow diagram that illustrates an example process 700 to cause deep responses to be presented to a user 106.

Block 702 illustrates receiving a data item. The ontology module 116 may receive an input 302. As described above, the input 302 may be a data item such as a text document, image, video, etc.

Block 704 illustrates extracting ontological elements 304 from the data item. In some examples, the input 302 may be tagged and the ontology module 116 may extract the ontological elements 304 based on the tagged input 302. In additional or alternative examples, the ontology module 116 may apply the ontology model 216 to infer the ontological elements 304. In at least one example, the ontology module 116 may apply the ontology model 216 to a tagged data item 302 to determine additional or alternative ontological elements 304. That is, the input 302 may be associated with more than one set of ontological elements 304. The ontology module 116 may send the ontological elements 304 to the database 128.

Block 706 illustrates accessing response templates 208. The database 128 may access response templates 208 that are mapped to the ontological elements 304. The database 128 may send the response templates 208 to the response module 120.

Block 708 illustrates creating responses 306. The response module 120 may supplement the response templates 208 with information specific to the input 302. The response module 120 may send the responses 306 to the relevance module 124.

Block 710 illustrates ranking the responses 306. In some examples, two or more responses 306 may be associated with the ontological elements 304. In such examples, the relevance module 120 may apply the relevance model 218 to each of the responses 306. Based at least in part on applying the relevance model 218, the relevance module 124 may rank the responses 306, as described above.

Block 712 illustrates causing the ranked responses 308 to be presented to a user device 108. The relevance module 124 may cause the ranked responses 308 to be presented to a user 106 via a user device 108. In some examples, the relevance module 124 may send a predetermined number of top ranked responses 308 to the user device 108. In other examples, the relevance module 124 may send a number of ranked responses 308 above a predetermined threshold to the user device 108. In other examples, the user device 108 may access the ranked responses 308 from the service provider 102.

Figure 8:
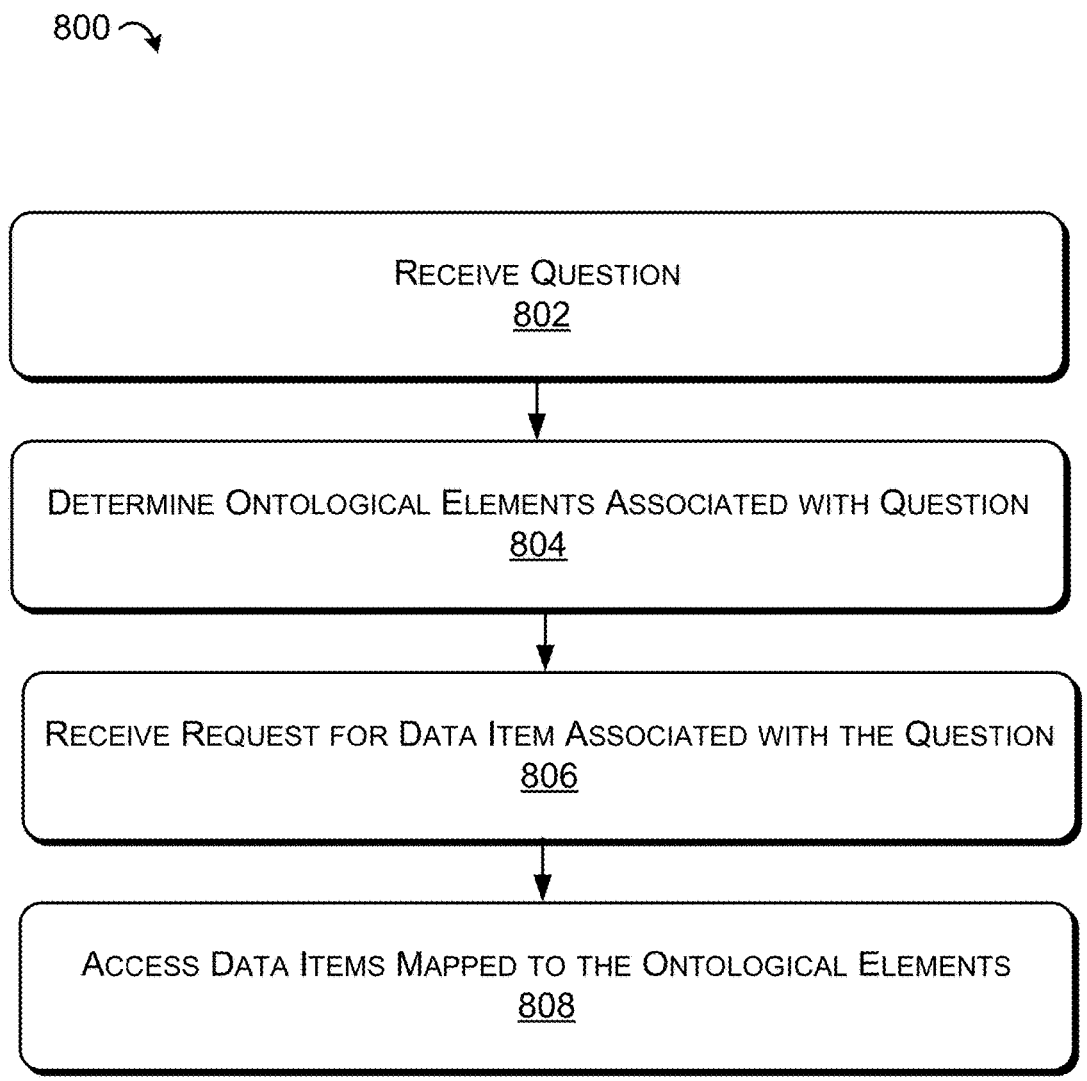
FIG. 8 is a flow diagram that illustrates an example process to access data items for answering questions.

In at least one example, users 106 may utilize the service provider 102 to access data items for answering deep questions. FIG. 8 is a flow diagram that illustrates an example process 800 to access data items for answering deep questions.

Block 802 illustrates receiving a question. A user 106 may input a question into the ontology module 116.

Block 804 illustrates determining ontological elements associated with the question. In some examples, the ontology module 116 may apply the ontology model 216 to infer the ontological elements.

Block 804 illustrates receiving a request for the data item associated with the question. The ontology module 116 may send a request for a data item (e.g., text document, etc.) associated with the question. The request may include the ontological elements associated with the question.

Block 806 illustrates accessing data items mapped to the ontological elements. The database 128 may leverage the ontological elements that are mapped to individual data items to access data items that may be useful for answering the question.

A. A system comprising one or more processors; memory; and one or more modules stored in the memory and executable by the one or more processors to perform operations comprising: accessing a plurality of data items; determining an ontology for the plurality of data items, the ontology including one or more ontological elements; sending, to a plurality of devices, a request to generate response templates based on the one or more ontological elements; and receiving, from the plurality of devices, the response templates directed to the one or more ontological elements.

B. The system as paragraph A recites, the operations further comprising: storing the response templates in a database; receiving a new data item associated with the one or more ontological elements; and based at least in part on receiving the new data item, accessing individual response templates of the response templates stored in the database, the individual response templates mapped to the one or more ontological elements.

C. The system as paragraph A or B recites, wherein the one or more ontological elements comprise: a label element that is semantically associated with an individual data item of the individual data items; and a sub-label element that is semantically associated with a portion of the individual data item.

D. The system as any of paragraphs A-C recite, wherein the response templates are generally applicable data items that are associated with the one or more ontological elements.

E. The system as any of paragraphs A-D recite, the operations further comprising generating a response based at least in part on an individual response template of the response templates directed to the one or more ontological elements, the generating comprising: accessing a data item from the plurality of data items, the data item associated with the one or more ontological elements; accessing, from a database storing the response templates, the individual response template; and supplementing the individual response template with corresponding information specific to the data item to generate the response.

F. The system as paragraph E recites, the operations further comprising: sending the response to a second plurality of devices; and receiving, from the second plurality of devices, feedback including a relevance score associated with the individual response template, the relevance score based at least in part on determining a relatedness between the response and the data item.

G. The system as paragraph F recites, the operations further comprising training a relevance model based at least in part on the relevance score, the data item, and the response.

H. A computer-implemented method comprising: accessing a plurality of data items, the plurality of data items being associated with one or more labels and one or more sub-labels; sending, to a plurality of devices, a request to generate a response template associated with a label of the one or more labels and a sub-label of the one or more sub-labels; receiving, from the plurality of devices, a plurality of response templates associated with the label and the sub-label, wherein the plurality of response templates are generally applicable to data items associated with the label and sub-label; and storing at least some response templates of the plurality of response templates in a database.

I. A computer-implemented method paragraph H recites, wherein the database maps each of the plurality of response templates to the label and the sub-label.

J. A computer-implemented method as paragraph H or I recites, wherein: individual data items of the plurality of data items are text documents; the label corresponds to a category that is semantically associated with a substantial majority of a text document of the text documents; and the sub-label corresponds to a section that is semantically associated with a portion of the text document, the portion being less than the substantial majority of the text document.

K. A computer-implemented method as any of paragraphs H-J recite, further comprising training a ontology model based at least in part on the plurality of data items and a corresponding label and sub-label, the ontology model being trained to infer the label and the sub-label from new data items.

L. A computer-implemented method as any of paragraphs H-K recite, wherein individual response templates of the plurality of response templates include one or more slots configured to be filled with information specific to a data item of the plurality of data items to generate a response associated with the data item.

M. A computer-implemented method as any of paragraphs H-L recite, further comprising: accessing a data item of the plurality of data items; generating a response associated with the data item based at least in part on supplementing an individual response template of the plurality of response templates with corresponding information specific to the data item; sending the response to one or more devices; and receiving, from the one or more devices, feedback including a relevance score associated with the response, the relevance score based at least in part on a relatedness between the response and the data item.

N. A computer-implemented method as paragraph M recites, further comprising training a relevance model based at least in part on the relevance score, the response, and the data item, the training including: determining a first feature vector based at least in part on a distance between the data item and the response; accessing a second data item with a second relevance score that is above a predetermined threshold, the second relevance score based at least in part on the relatedness between the second data item and the response; determining a second feature vector based at least in part on a distance between the data item and the second data item; combining the first feature vector and the second feature vector to determine a combined feature vector; and training the relevance model based at least in part on the combined feature vector, the response, and the data item.

O. A computer-implemented method as any of paragraphs H-N recite, wherein: the plurality of devices are associated with a plurality of users; and receiving the plurality of response templates comprises receiving the plurality of response templates authored by the plurality of users.

P. One or more computer-readable media encoded with instructions that, when executed by a processor, configure a computer to perform a method as any of paragraphs H-O recite.

Q. A device comprising one or more processors and one or more computer readable media encoded with instructions that, when executed by the one or more processors, configure a computer to perform a computer-implemented method as recited in any of paragraphs H-O.

R. A computer-implemented method comprising: means for accessing a plurality of data items, the plurality of data items being associated with one or more labels and one or more sub-labels; means for sending, to a plurality of devices, a request to generate a response template associated with a label of the one or more labels and a sub-label of the one or more sub-labels; means for receiving, from the plurality of devices, a plurality of response templates associated with the label and the sub-label, wherein the plurality of response templates are generally applicable to data items associated with the label and sub-label; and means for storing at least some response templates of the plurality of response templates in a database.

S. A computer-implemented method paragraph R recites, wherein the database maps each of the plurality of response templates to the label and the sub-label.

T. A computer-implemented method as paragraph R or S recites, wherein: individual data items of the plurality of data items are text documents; the label corresponds to a category that is semantically associated with a substantial majority of a text document of the text documents; and the sub-label corresponds to a section that is semantically associated with a portion of the text document, the portion being less than the substantial majority of the text document.

U. A computer-implemented method as any of paragraphs R-T recite, further comprising means for training a ontology model based at least in part on the plurality of data items and a corresponding label and sub-label, the ontology model being trained to infer the label and the sub-label from new data items.

V. A computer-implemented method as any of paragraphs R-U recite, wherein individual response templates of the plurality of response templates include one or more slots configured to be filled with information specific to a data item of the plurality of data items to generate a response associated with the data item.

W. A computer-implemented method as any of paragraphs R-V recite, further comprising: means for accessing a data item of the plurality of data items; means for generating a response associated with the data item based at least in part on supplementing an individual response template of the plurality of response templates with corresponding information specific to the data item; means for sending the response to one or more devices; and means for receiving, from the one or more devices, feedback including a relevance score associated with the response, the relevance score based at least in part on a relatedness between the response and the data item.

X. A computer-implemented method as paragraph W recites, further comprising means for training a relevance model based at least in part on the relevance score, the response, and the data item, the training including: determining a first feature vector based at least in part on a distance between the data item and the response; accessing a second data item with a second relevance score that is above a predetermined threshold, the second relevance score based at least in part on the relatedness between the second data item and the response; determining a second feature vector based at least in part on a distance between the data item and the second data item; combining the first feature vector and the second feature vector to determine a combined feature vector; and training the relevance model based at least in part on the combined feature vector, the response, and the data item.

Y. A computer-implemented method as any of paragraphs R-X recite, wherein: the plurality of devices are associated with a plurality of users; and receiving the plurality of response templates comprises receiving the plurality of response templates authored by the plurality of users.

Z. A system comprising: one or more processors; memory; and one or more modules stored in the memory and executable by the one or more processors to perform operations comprising: receiving a data item from a user device; extracting ontological elements from the data item; accessing two or more response templates associated with the ontological elements; creating two or more responses based at least in part on supplementing the two or more response templates with information that is specific to the data item; ranking individual responses of the two or more responses based at least in part on a relevance between the individual responses and the data item; and causing at least one of the ranked individual responses to be presented via the user device.

AA. A system as paragraph Z recites, wherein the operations further comprise extracting the ontological elements from the data item based at least in part on applying an ontology model to the data item and inferring the ontological elements from the data item.

AB. A system as paragraph Z or AA recites, wherein the ranking the individual responses is based at least in part on applying a relevance model to the two or more responses to determine individual responses of the two or more responses that are most relevant to the data item.

AC. A system as any of paragraphs Z-AB recites, wherein: the data item is a corpus of text; the ontological elements include a label and a sub-label associated with the corpus of the text; the two or more response templates comprise question templates associated with the label and the sub-label; and the two or more responses comprise questions that are answerable based at least in part on the corpus of text.

AD. A system as any of paragraphs Z-AC recite, wherein the questions are answerable using more than a single sentence of text in the corpus of text.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed is:

1. A system comprising:
one or more processors;
memory; and
one or more modules stored in the memory and executable by the one or more processors to perform operations comprising:
accessing a plurality of data items, the plurality of data items being associated with one or more labels and one or more sub-labels;
determining, using at least one of latent Dirichlet allocation, a word cloud, and a classifier model, an ontology for the plurality of data items the ontology including one or more ontological elements, the ontology including a product of the label and the sub-label, the one or more ontological elements comprise a label of the one or more labels that is semantically associated with a data item of the data items and a sub-label of the sub-labels that is semantically associated with a portion of the data item;
crowdsourcing response templates including sending, to a plurality of devices with associated different users, a request for a respective user of the different users to generate one or more response templates based on the one or more ontological elements, one or more of the response templates including a question with a subject of the question as a slot and an ontological element of the one or more ontological elements in the question;
receiving, from the plurality of devices, the response templates generated by the different users and directed to the one or more ontological elements storing the response templates in a database;
receiving a new data item associated with the one or more ontological elements; and
based at least in part on receiving the new data item, accessing an individual response template of the response templates stored in the database, the individual response template mapped to the one or more ontological elements.

2. The system as claim 1 recites, wherein the response templates are applicable data items that are associated with the one or more ontological elements.

3. The system as claim 1 recites, the operations further comprising generating a response based at least in part on an individual response template of the response templates directed to the one or more ontological elements, the generating comprising:
accessing a data item from the plurality of data items, the data item associated with the one or more ontological elements;
accessing, from a database storing the response templates, the individual response template; and
supplementing the individual response template with corresponding information specific to the data item to generate the response.

4. The system as claim 3 recites, the operations further comprising:
sending the response to a second plurality of devices with associated second different users; and
receiving, from the second different users and through the second plurality of devices, feedback including a relevance score associated with the individual response template, the relevance score based at least in part on determining a relatedness between the response and the data item.

5. The system as claim 4 recites, the operations further comprising training a relevance model based at least in part on the relevance score, the data item, and the response.

6. A computer-implemented method comprising:
accessing a plurality of data items, the plurality of data items being associated with one or more labels and one or more sub-labels;
determining, using at least one of latent Dirichlet allocation, a word cloud, and a classifier model, an ontology for the plurality of data items, the ontology including one or more ontological elements, the ontology including a product of one or more labels of the one or more labels and one or more sub-labels of the one or more sub-labels, the one or more ontological elements comprise a label of the one or more labels that is semantically associated with a data item of the data items, and a sub-label of the one or more sub-labels that is semantically associated with a portion of the data item;
crowdsourcing response templates including sending, to a plurality of devices, a request for respective users of the plurality of devices to generate a response template associated with a label of the one or more labels and a sub-label of the one or more sub-labels;
receiving, from the plurality of devices, a plurality of response templates generated by the respective users and associated with the label and the sub-label, wherein the plurality of response templates are applicable to data items associated with the label and sub-label, one or more of the plurality of response templates including a question with a subject of the question as a slot and the label and the sub-label in the question;
storing at least some response templates of the plurality of response templates in a database;
receiving a new data item associated with the one or more ontological elements; and
based at least in part on receiving the new data item, accessing individual response templates of the response templates stored in the database, the individual response templates mapped to the one or more ontological elements.

7. A computer-implemented method as claim 6 recites, wherein the database maps each of the plurality of response templates to the label and the sub-label.

8. A computer-implemented method as claim 6 recites, wherein:
individual data items of the plurality of data items are text documents;
the label corresponds to a category that is semantically associated with a majority of a text document of the text documents; and
the sub-label corresponds to a section that is semantically associated with a portion of the text document, the portion being less than the majority of the text document.

9. A computer-implemented method as claim 6 recites, further comprising training a ontology model based at least in part on the plurality of data items and a corresponding label and sub-label, the ontology model being trained to infer the label and the sub-label from new data items.

10. A computer-implemented method as claim 6 recites, further comprising:
accessing a data item of the plurality of data items;
generating a response associated with the data item based at least in part on supplementing an individual response template of the plurality of response templates with corresponding information specific to the data item;
sending the response to one or more devices; and
receiving, from the one or more devices, feedback including a relevance score associated with the response, the relevance score based at least in part on a relatedness between the response and the data item.

11. A computer-implemented method as claim 10 recites, further comprising training a relevance model based at least in part on the relevance score, the response, and the data item, the training including:
determining a first feature vector based at least in part on a distance between the data item and the response;
accessing a second data item with a second relevance score that is above a predetermined threshold, the second relevance score based at least in part on the relatedness between the second data item and the response;
determining a second feature vector based at least in part on a distance between the data item and the second data item;
combining the first feature vector and the second feature vector to determine a combined feature vector; and
training the relevance model based at least in part on the combined feature vector, the response, and the data item.

* * * * *